United States Patent [19]

Takeshita et al.

[11] Patent Number: 5,352,290
[45] Date of Patent: Oct. 4, 1994

[54] CONCRETE COMPOSITION

[75] Inventors: Haruyuki Takeshita; Haruya Sawara; Shohei Hoshino; Yoshiyuki Shoji, all of Tokyo, Japan

[73] Assignee: JDC Corporation, Tokyo, Japan

[21] Appl. No.: 902,925

[22] Filed: Jun. 23, 1992

[30] Foreign Application Priority Data

Jun. 25, 1991 [JP] Japan .................................. 3-153223
Jun. 2, 1992 [JP] Japan .................................. 4-141387

[51] Int. Cl.$^5$ ..................... C04B 24/00; C04B 24/10; C04B 24/12
[52] U.S. Cl. .................................. 106/802; 106/724; 106/727; 106/729; 106/730; 106/805; 106/808; 106/822; 106/823
[58] Field of Search ............... 106/805, 808, 822, 823, 106/802, 724, 729, 730, 727

[56] References Cited

U.S. PATENT DOCUMENTS

| | | | |
|---|---|---|---|
| 4,707,187 | 11/1987 | Tsuda et al. | 106/805 |
| 4,707,188 | 11/1987 | Tsuda et al. | 106/805 |

FOREIGN PATENT DOCUMENTS

| | | | |
|---|---|---|---|
| 0115955 | 8/1984 | European Pat. Off. | 106/805 |
| 59-131547 | 7/1984 | Japan | 106/805 |
| 3-045544 | 2/1991 | Japan . | |

OTHER PUBLICATIONS

"Glossary of Technical Terms In Japanese Industrial Standards", Japanese Standards Association pp. 519 and 869 (1987).
"Glossary of Concrete Terms" Association of Concrete Engineering, (1983).

*Primary Examiner*—Anthony Green
*Attorney, Agent, or Firm*—Kane, Dalsimer, Sullivan, Kurucz, Levy, Eisele and Richard

[57] ABSTRACT

A concrete composition which has superior fluidity and filling property and from which a concrete structure having high quality and durability and being excellent in resistance to freezing and thawing can be made without compaction by vibration. The composition comprises cement, water, aggregate, at least one admixture selected from the group consisting of a water reducing agent, an air entraining agent, an air entraining water reducing agent and a superplasticizer, and at least one viscosity improver of a cellulose type of viscosity improver having a low foaming property which shows specific viscosity and an acrylic type of viscosity improver having a low viscosity which shows specific viscosity in a specified amount.

39 Claims, 2 Drawing Sheets

CONCRETE COMPOSITION

BACKGROUND OF THE INVENTION

The present invention relates to a concrete composition, and more particularly to a concrete composition which has high fluidity and filling property and from which a concrete structure having high quality and durability and being excellent in resistance to freezing and thawing can be made without compaction by vibration.

A concrete composition is in general prepared by adding cement and water, and, if necessary, an air entraining agent, a water reducing agent, etc. to aggregate such substances as gravel or sand, and mixing the mixture with stirring. In the case where a concrete structure, in particular, one having a complicated structure, is made of a concrete composition having such composition, it is necessary to carry out sufficient placing and compaction of the concrete composition by using a vibrator or a tamping bar in order to extend the concrete composition to all the corners of the structure. Presently, however, it is difficult to carry out sufficient placing and compaction of a concrete composition due to a marked shortage of experienced workers, elimination or reduction of labor, etc.

The use of concrete composition which has improved fluidity and is prepared by increasing the water content per unit volume of concrete or by adding a superplasticizer or a water reducing agent in order to eliminate the step of placing and compaction to improve execution is increasing. In the case of improving the fluidity of a concrete composition as described above, however, material segregation (separation of aggregate and cement paste and/or setting of the aggregate) easily occurs, so that the quality of the structure made of the concrete composition, such as homogeneity, is impaired. In the concrete composition, bleeding also easily occurs, and bleeding water is collected in the area under the aggregate, reinforcing bars, etc. Water enters from the outside via the traces of the bleeding water and the reinforcing bars rust, so that the durability of the concrete structure is reduced.

Therefore, the development of a concrete composition from which a concrete structure having high quality and durability can be made independent of the technical level of workers and/or any process of making the structure is highly desired, and various concrete compositions having well-balanced fluidity and resistance to material segregation, the placing of which can be carried out without compaction by vibration, have been developed by using a viscosity improver comprising a water-soluble polymer.

One such concrete compositions is a concrete composition developed by the inventors of the present invention (Japanese Laid-Open (KOKAI) Publication 3-45544 (45544/1991)). The concrete composition contains a cellulose or acrylic type of a viscosity improver and a superplasticizer and has a 45 to 80 cm slump flow value, thereby having such a high fluidity and resistance to material segregation as to be capable of sufficiently carrying out close placing without compaction by vibration. Since the viscosity improver may increase the air content in the concrete composition to reduce the strength of the concrete structure due to the foaming property of the above type of viscosity improver, the concrete composition furthermore contains an antifoaming agent for breaking comparatively large bubbles formed with the viscosity improver, and simultaneously an air entraining agent for forming comparatively fine bubbles. As a result, 3 to 6% by volume of air in the form of bubbles which are as fine as possible is introduced to the concrete composition as a whole, the air resistance to freezing and thawing of the hardened concrete composition thereby being improved.

It has now been found that the above concrete composition has the following disadvantages because an antifoaming agent is contained:

As seen from Table 1, which shows the results of the experiment of the above-described concrete composition carried out by the inventors of the present invention, the action of the antifoaming agent continues for some time so that the air content just after preparing the concrete composition and the one in the concrete composition after it is hardened is fairly different. Therefore, it is difficult to adjust the air content to be contained in a hardened concrete composition precisely to the specified air content for ensuring resistance to freezing and thawing, that is, 3 to 6% by volume.

TABLE 1

Relationship between Air Content in Conventional Concrete Composition and Resistance to Freezing and Thawing

| Air Content in Conventional Concrete Composition*[1] (% by volume) | | | | | Resistance to Freezing and Thawing |
|---|---|---|---|---|---|
| Just After Preparation | After 15 min. | After 30 min. | After 50 min. | After Hardening | |
| 6.0 | 4.1 | — | — | 3.7 | good |
| 7.5 | 5.4 | — | — | 3.2 | good |
| 11.0 | 8.6 | 6.2 | — | 5.4 | good |
| 10.5 | 7.4 | 6.8 | 5.8 | 5.3 | good |

*[1])Contained Viscosity Improver: methyl cellulose (0.3% by weight, based on water)
Contained Antifoaming Agent: a polar organic composition (0.03 to 0.05% by weight, based on water)

As can also be seen from Table 2, which shows the results of the other experiment carried out by the inventors of the present invention, an antifoaming agent breaks even fine bubbles formed by an air entraining agent and has a bad influence on the improvement of resistance to freezing and thawing of a concrete structure.

TABLE 2

Relationship of Air Content in Concrete Structure after Hardening, Specific Surface of Bubbles and Coefficient of Bubble Distance

| | Air Content in Concrete Structure after Hardening (% by volume) | Specific Surface of Bubbles ($cm^2/cm^3$) | Coefficient of Bubble Distance ($\mu m$) |
|---|---|---|---|
| High-fluid Concrete Composition Containing Antifoaming Agent*[2] | 3.7 | 156 | 367 |
| | 5.8 | 164 | 322 |
| Conventional Concrete Composition*[3] | 4.0 | 250 | 221 |
| | 4.7 | 259 | 231 |

*[2])Contained Viscosity Improver: methyl cellulose (0.3% by weight, based on water)
Contained Antifoaming Agent: a polar organic composition (0.03 to 0.05% by weight, based on water)
*[3])This composition contains neither any viscosity improver nor any antifoaming agent.

That is, from Table 2, it can be found that the concrete structure made of the above concrete composition having high fluidity and containing both a viscosity improver and an antifoaming agent has a smaller specific surface of bubbles and a larger coefficient of bubble distance than those of the concrete structure made of the conventional concrete composition with neither viscosity improver nor antifoaming agent even though these concrete structures have similar air content, that is, the antifoaming agent breaks even the fine bubbles formed by the air entraining agent.

As a result of research taking the above circumstances into consideration, the inventor has found that the above disadvantages can be avoided by using a cellulose type of viscosity improver having a specific property and/or an acrylic type of viscosity improver having a specific property in a specified amount.

SUMMARY OF THE INVENTION

An object of the present invention is to substantially eliminate the defect or drawback encountered in the prior art, and to provide a concrete composition which has superior fluidity and resistance to material segregation and from which a concrete structure having superior resistance to freezing and thawing can be made.

These and other objects can be achieved according to the present invention by providing a concrete composition comprising cement, water, aggregate, at least one admixture selected from the group consisting of a water reducing agent, an air entraining agent, an air entraining water reducing agent and a superplasticizer, and at least one of a cellulose type of viscosity improver having a low foaming property which shows 100 to 10,000 centipoises of viscosity at a 1% ratio in a aqueous solution, as a cellulose type of viscosity improver and an acrylic type of viscosity improver having a low viscosity which shows 5 to 100 centipoises of viscosity at a 0.5% ratio in a 4% saltwater solution, as an acrylic type of viscosity improver, the total amount of the viscosity improver(s) being 0.02 to 0.5% by weight, based on cement, and having superior fluidity and resistance to material segregation.

According to the present invention, because a specific viscosity improver is used in a specified amount, the introduction of excessive air in the concrete composition can be prevented without impairing the desired fluidity and resistance to material segregation and, thus, it is possible to dispense with any antifoaming agent.

DESCRIPTION OF THE INVENTION

Figure 1:
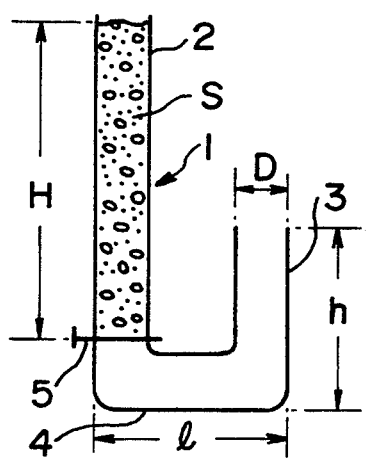
FIG. 1 is an L-type instrument for measuring fluidity, which shows the condition after a sample is filled.

The importance of the present invention is to easily and surely introduce a hardened concrete composition having 3 to 6% by volume, based on the hardened concrete composition, of air content, which is necessary for improving the resistance to freezing and thawing of a concrete structure, made from a concrete composition containing a viscosity improver and at least one of a reducing agent, an air entraining water reducing agent, a superplasticizer and an air entraining agent, without any antifoaming agent, and with a cellulose type of viscosity improver having a low foaming property which shows a specific viscosity and/or an acrylic type of viscosity improver having a low viscosity which shows a specific viscosity in a specified amount, as described above, and to ensure sufficient fluidity and resistance to material segregation.

The viscosity of a cellulose type of viscosity improver having a low foaming property at a 1% ratio in an aqueous solution (abbreviated to a viscosity of a cellulose type of viscosity improver) and the viscosity of an acrylic type of viscosity improver having a low viscosity at a 0.5% ratio in a 4 % saltwater solution (abbreviated to a viscosity of an acrylic type of viscosity improver) are measured by the Brookfield type viscometer.

The viscosity of a cellulose type of viscosity improver is 100 to 10,000 centipoises (cP), preferably 500 to 6,000 centipoises, and in particular 700 to 5,000 centipoises. If the viscosity is less than 100 centipoises, a viscosity necessary for inhibiting aggregate settling is not attained, and if the viscosity is more than 10,000 centipoises, the viscosity improver has a foaming property which is too high and thus needs an antifoaming agent for controlling the air content. Therefore, in the present invention, the viscosity is defined as 100 to 10,000 centipoises.

The cellulose type of viscosity improver used in the present invention contains hydroxyethyl cellulose, hydroxyethylmethyl cellulose and/or hydroxyethylethyl cellulose, and preferably hydroxyethyl cellulose having a lower foaming property.

The hydroxyethyl cellulose having a low foaming property which shows 100 to 10,000 centipoises of viscosity at a 1% ratio in an aqueous solution preferably shows 58 to 68 dynes/cm of surface tension at a 0.2% ratio in an aqueous solution. The hydroxyethyl cellulose having such a large surface tension is preferably used because the larger the surface tension is, the lower the foaming property is. The hydroxyethyl cellulose having a low foaming property which shows 100 to 10,000 centipoises of viscosity at a 1% ratio in an aqueous solution preferably has a molar substitution of hydroxyethyl (MS) of 1.5 to 4.0, which means moles of ethylene oxide substituted per unit of glucose, because the hydroxyethyl cellulose having less than a 1.5 molar substitution of hydroxyethyl has poor solubility and that having more than 4.0 is difficult to find.

The viscosity of the acrylic type of viscosity improver is 5 to 100 centipoises, and preferably 20 to 50 centipoises. If the viscosity is less than 5 centipoises, the viscosity necessary for inhibiting aggregate settling is not attained, and if the viscosity is more than 100 centipoises, the foaming property of the viscosity improver is too high foaming property, and therefore, in the present invention, the viscosity is defined as 5 to 100 centipoises.

The acrylic type of viscosity improver used in the present invention contains polyacrylamide, polymethacrylamide or a copolymer of acrylamide or methacrylamide and acrylic acid, vinylsulfonic acid, 2-acrylamido-2-methylpropanesulfonic acid or 2-acrylamidopropanesulfonic acid, and preferably a copolymer of acrylamide or methacryamide and sulfoalkylacrylamide which contains 2 mole % or more sulfoalkylacrylamide monomer, based on acrylamide or methacrylamide monomer, because the copolymer is easily dispersed and thus the water content per unit volume of concrete can be more reduced.

Each of these types of viscosity improver can be used alone or as a mixture of two or more.

The cellulose type and acrylic type of viscosity improver can be used together. In this case, the ratio of the cellulose type to the acrylic type is preferably 1:1 to 5:1.

These types of viscosity improver are useful for ensuring sufficient fluidity and resistance to material segregation of the concrete composition and for introducing air in a fine form to the composition. If the added amount of the viscosity improver is less than 0.02% by weight, based on cement, an insufficient viscosity is obtained and, thus, sufficient resistance to aggregate separation can not be attained. If it is more than 0.5 % by weight, an excessive air content is introduced or the viscosity is so high that sufficient fluidity can not be attained and workability is reduced. Therefore, in the present invention, the amount of the viscosity improver to be added is defined as 0.02 to 0.5% by weight. The amount of the viscosity improver to be added is 0.1 to 1.0% by weight, and preferably 0.15 to 0.5% by weight, based on water. For example, in the case where the amount of cement is 300 kg/m$^3$ and the amount of water is 180 kg/m$^3$, the amount of the viscosity improver to be added, 0.02 to 0.5% by weight, based on cement, corresponds to the amount of the viscosity improver to be added, 0.033 to 0.833% by weight, based on water. The amount of the viscosity improver to be added depends on the amount of cement and water, and in the case where the amount of cement is more or the amount of water is less, the added amount of the viscosity improver is in the lower part of the above-described range.

A water reducing agent can be used for reducing the amount of water to be used and improving workability, and contains polyol complex, lignin sulfonic acid compound and/or oxycarboxylate. The water reducing agent is contained in the concrete composition in an amount of, in general, 0.1 to 2.5% by weight, and preferably 0.2 to 0.5% by weight, based on cement.

An air entraining water reducing agent can be used for introducing air in the form of fine bubbles and reducing the amount of water to be used, and contains lignin sulfonic acid compound, polyol complex and/or oxycarboxylate. The air entraining water reducing agent is contained in the concrete composition in an amount of, in general, 0.1 to 1.5% by weight, and preferably 0.2 to 0.5% by weight, based on cement.

A superplasticizer which can be used contains a highly condensed compound of triazine series, a derivative of melamin sulfonate/formalin condensate series or polycarboxylate series, a denatured compound of lignin sulfonate series, a polymer of aromatic aminosulfonic acid series and/or a compound of naphthalene sulfonate/formalin condensate series, and preferably highly condensed compound of triazine series. The superplasticizer is contained in the concrete composition in an amount of, in general, 1 to 5% by weight, and preferably 1.5 to 3.0% by weight, based on cement.

Among the water reducing agent, the air entraining water reducing agent and the superplasticizer, the superplasticizer is particularly preferably used.

An air entraining agent has the function of fining the introduced air, and contains natural resin acid series and/or surfactant series used in a conventional concrete composition, such as an anionic surfactant of alkylallylsulfonic acid compound series, a natural resinate and/or a sulfate type of nonionic anionic surfactant. An anionic surfactant of fatty acid soap series of the the general formula I $$RCOONa \qquad I,$$

or resin acid soap series of the general formula II

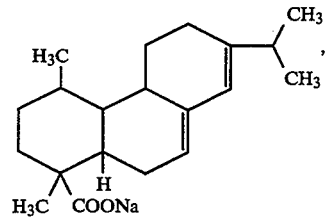

such as Vinsol ® (produced by YAMASO CHEMICAL Co., Ltd.), is particularly preferable, because they have superior air retaining properties so that the difference between the air content just after preparation and that upon hardening is small and sufficient resistance to freezing and thawing is attained at a smaller introduced air content. The air content introduced by the air entraining agent varies according to the sort and/or amount of aggregate used and the viscosity improver, temperature, mixing method, etc; therefore, it is necessary to control the amount of the air entraining agent to be used by a test mixing so as to fit these conditions. The amount of the air entraining agent to be used is suitably, in general, 0.002 to 0.2% by weight, and preferably 0.003 to 0.15% by weight, based on cement, and/or 5 to 800 g, and preferably 10 to 500 g, per m$^3$ of the concrete composition.

In the present invention, at least one of the water reducing agent, the air entraining water reducing agent, the superplasticizer and the air entraining agent is used, and preferably at least one of the water reducing agent, the air entraining water reducing agent and the superplasticizer, in addition to the air entraining agent are used.

Cement used in the present invention contains normal Portland cement, blast furnance cement, silica cement and/or fly ash cement. In addition, it contains inorganic powder such as blast furnance slag or fly ash, and/or further a substance having a pozzolanic reaction such as stone dust or silica fume.

The amount of cement to be used is, in general, 250 to 450 kg, preferably 270 to 420 kg, and in particular 300 to 400 kg, per m$^3$ of the concrete composition.

Water to be used in the present invention contains plain water such as water from pipes, rivers or lakes, and can also contains sea water.

The concrete composition according to the present invention can also contain one or more substances selected from blast furnance slag powder, an expanding agent, fly ash, silica powder and natural material powder.

It is necessary for the slump flow value of the concrete composition to be 45 to 80 cm in order to obtain a concrete structure having high quality and durability without compaction by vibration. If the slump flow value is less than 45 cm, the fluidity of the concrete composition is so poor that voids easily occur on execution and thus it becomes necessary to carry out compaction by vibration, and, if the slump flow value is more than 80 cm, the fluidity is higher but material segregation easily occurs. A slump flow value within the above range is obtained by controlling the amount of at least one of the water reducing agent, the air entraining water reducing agent, the superplasticizer and the air entraining agent, and the amount of the viscosity improver to be added to be within the above ranges, respectively.

It is desirable that the sizes of the bubbles to be introduced are as fine as possible, in view of the strength and resistance to freezing and thawing of the concrete structure. If a viscosity improver is added to a concrete composition, relatively large bubbles are easily introduced, in general. In the concrete composition according to the present invention, the above-described specific viscosity improver and, if necessary, the air entraining agent are used, so that large bubbles are not introduced. Furthermore, no antifoaming agent is used, and thus, the introduced fine bubbles are not broken during curing. Therefore, air can easily be introduced in the form of fine bubbles in a specified amount to the concrete composition.

In order to attain sufficient resistance to freezing and thawing for the hardened concrete composition, a 3 to 6% volume of air must be introduced, based on the volume of the hardened concrete composition, because if the air content is less than 3% by volume, sufficient resistance to freezing and thawing can not be attained, and if it is more than 6% by volume, the strength is remarkably reduced. This air content can be attained by using 0.02 to 0.5% by weight, based on cement, of the specific viscosity improver. The amount of air to be introduced varies according to the method of adding the viscosity improver. Concretely, in the case where the viscosity improver is added in a slurry form to the mixture comprising cement, aggregate, water, a water reducing agent, an air entraining water reducing agent, a superplasticizer and/or an air entraining agent, the air content is less than that in the case where the viscosity improver is added in powder.

The representative composition of the concrete composition according to the present invention is as follows:

| Cement | 250 to 450 kg/m³ |
| --- | --- |
| Aggregate | 1600 to 1900 kg/m³ |
| Water | 160 to 195 kg/m³ |
| Cellulose Type and/or Acrylic Type of Viscosity Improver | 0.05 to 2.1 kg/m³ |
| Superplasticizer | 5 to 20 l/m³ |
| Air Entraining Agent | 5 to 800 g/m³. |

The preferable range of the composition is as follows:

| Cement | 300 to 400 kg/m³ |
| --- | --- |
| Aggregate | 1650 to 1850 kg/m³ |
| Water | 165 to 190 kg/m³ |
| Cellulose Type and/or Acrylic Type of Viscosity Improver | 0.20 to 1.0 kg/m³ |
| Superplasticizer | 6 to 15 l/m³ |
| Air Entraining Agent | 10 to 500 g/m³. |

The concrete composition according to the present invention can be prepared according to the conventional method, for example, by introducing cement, aggregate, water, an air entraining water reducing agent, and so on, into a freshly mixed concrete plant, stirring the mixture, and then adding a cellulose type of viscosity improver having a low foaming property and/or an acrylic type of viscosity improver having a low viscosity to the mixture, and mixing with stirring. Alternatively, at the job site, the concrete composition is prepared by adding the slurry of the above viscosity improver and a superplasticizer to a usual base concrete.

Now, the present invention will be described in detail in connection with the following examples, but it is not intended to restrict the present invention by these examples.

EXAMPLE 1

This example shows that a specified air content, which is capable of expressing superior resistance to freezing and thawing and strength, can be introduced to the hardened concrete composition, without any antifoaming agent, by using a cellulose type of viscosity improver having a low foaming property in a specified amount.

On the basis of the materials shown in Table 3 and the proportions shown in Table 4, and using the viscosity improver, the air entraining water reducing agent, the superplasticizer and the air entraining agent in the amounts shown in Table 5, samples 1 and 2 of the present invention were prepared and the slump, air content and resistance to freezing and thawing thereof were measured. The results are shown in Table 6.

TABLE 3

| Materials Used | |
| --- | --- |
| Cement | Normal portland Cement |
| Fine Aggregate | 60% of River Sand from the Sagami Water System and 40% of Pit Sand from Ichihara (Specific Gravity 2.55, FM*⁴⁾ 2.50) |
| Coarse Aggregate | Crushed Stone from Shiroyama, Tsukui District, Kanagawa Prefecture, (Specific Gravity 2.64, FM 6.70) |
| Viscosity Improver | Hydroxyethyl Cellulose |
| Air Entraining Water Reducing Agent | Lignin Sulfonic Acid Compound Polyol Complex |
| Superplasticizer | Highly Condensed Compound of Triazine Series |
| Air Entraining Agent | Anion Surfactant of Alkylarylsulfonic Acid Compound Series |

*⁴⁾FM means fineness modulus.

*4 ) FM means fineness modulus.

TABLE 4

| Proportions in Concrete | |
| --- | --- |
| Maximum Size of Coarse Aggregate (mm) | 20 |
| Slump (cm) | 12 ± 2.5 |
| Water-Cement Ratio (W/C) (%) | 50.0 |
| Sand-Coarse Aggregate Ratio (s/a) (%) | 50.7 |
| Water (kg/m³) | 174 |
| Cement (kg/m³) | 348 |
| Fine Aggregate (kg/m³) | 875 |
| Coarse Aggregate (kg/m³) | 880 |

The slump shown in Table 4 is obtained by the following test.

Slump Test:

A concrete composition is filled in a slump cone having a height of 30 cm, an inside diameter of the lower end of 20 cm and an inside diameter of the upper end of 30 cm, in 1/3 volume portions, by pushing a set number of times with a standard stick. The cone is pulled up vertically and the concrete composition is removed, the concrete composition getting out of shape according to the softness thereof. The difference in height between the just-poured concrete composition and the same composition after it settles is measured as a slump (cm).

TABLE 5

| Sample of Present Invention | Amount of | | | |
|---|---|---|---|---|
| | Viscosity Improver ($W^x$ %) | Air Entraining Agent ($C^x$ %) | Superplasticizer ($C^x$ %) | Air Entraining Agent ($C^x$ %) |
| 1 | 0.25 | 0.275 | 1.99 | 0.002 |
| 2 | 0.30 | 0.25 | 2.21 | 0.004 |

TABLE 6

| Sample of Present Invention | Air Content (% by volume) | | | Resistance to Freezing and Thawing |
|---|---|---|---|---|
| | Just After Preparation | After 30 min. | After Hardening | |
| 1 | 6.0 | 4.7 | 4.6 | good |
| 2 | 6.8 | 6.6 | 6.0 | good |

Comparing the results in Table 6 and those in Table 1, it can be understood that the variations (reduction) in the air content in samples 1 and 2 are smaller than those in the conventional concrete composition, and thus, in samples 1 and 2 of the present invention the air content necessary for the hardened concrete composition can easily and surely be ensured. Therefore, it can be easily determined whether or not the hardened concrete composition contains a specified air content just by measuring the air content right after preparation of the concrete composition. Furthermore, air in a specified amount can easily be introduced, because it is comparatively easy to prevent the introduction of an excessive air content to these samples and the breakage of these introduced bubbles.

EXAMPLE 2

This example shows that a specified air content, which is capable of expressing superior resistance to freezing and thawing and strength, can be introduced to the hardened concrete composition and sufficient fluidity, filling property and resistance to material segregation can be attained, without any antifoaming agent, by using an acrylic type of viscosity improver having a low viscosity in a specified amount.

On the basis of the materials shown in Table 7 and the proportions shown in Table 8, and using the viscosity improver, the reducing agent, the superplasticizer and the air entraining agent in the amounts shown in Table 9, samples 3 and 4 of the present invention were prepared, and the slump, slump flow value just after preparation, air content and resistance to freezing and thawing thereof were measured. The results are shown in Table 10.

TABLE 7

| Material Used | |
|---|---|
| Cement | Normal portland Cement |
| Fine Aggregate | 60% of River Sand from the Sagami Water System and 40% of Pit Sand from Ichihara (Specific Gravity 2.55, FM 2.50) |
| Coarse Aggregate | Crushed Stone from Shiroyaaa, Tsukui District, Kanagawa Prefecture, (Specific Gravity 2.64, FM 6.70) |
| Viscosity Improver | Polyacrylamide |
| Water Reducing Agent | Polyol Complex |
| Superplasticizer | Highly Condensed Compound of Triazine Series |
| Air Entraining Agent | Natural Resinate |

TABLE 8

| Proportions in Concrete | |
|---|---|
| Maximum-Size of Coarse Aggregate (mm) | 20 |
| Slump (cm) | 12 ± 2.5 |
| Water-Cement Ratio (W/C) (%) | 50.0 |
| Sand-Corase Aggregate Ratio (s/a) (%) | 50.7 |
| Water (kg/m$^3$) | 174 |
| Cement (kg/m$^3$) | 348 |
| Fine Aggregate (kg/m$^3$) | 875 |
| Coarse Aggregate (kg/m$^3$) | 880 |

TABLE 9

| Sample of Present Invention | Amount of | | | |
|---|---|---|---|---|
| | Viscosity Improver ($W^x$ %) | Water Reducing Agent ($C^x$ %) | Superplasticizer ($C^x$ %) | Air Entraining Agent ($C^x$ %) |
| 3 | 0.30 | 0.30 | 2.43 | 0.15 |
| 4 | 0.30 | 0.275 | 2.65 | 0.12 |

TABLE 10

| Sample of Present Invention | Slump Flow Value Just After Preparation (cm) | Air Content (% by volume) | | | Resistance to Freezing and Thawing |
|---|---|---|---|---|---|
| | | Just After Preparation | After 30 min. | After Hardening | |
| 3 | 60 | 7.5 | 5.5 | 5.2 | good |
| 4 | 63 | 7.2 | 5.5 | 5.0 | good |

The slump flow value shown in Table 10 is obtained by the following test.

Slump Flow Test:

It is carried out in the same manner as described in the above Slump Test, and the extension of the concrete composition is measured vertically and horizontally after 5 minutes. The average of these measurements corresponds to the slump flow value.

Furthermore, the fluidity and filling property of samples 3 and 4 in a fresh concrete condition are determined by the following tests:

Fluidity Test:

The instrument for measuring fluidity, as shown in FIG. 1, comprises a main body 1 constructed by a tube having a 100 mm inner diameter (D), the main body 1 being comprised of the primary side part 2 having a 600 mm height (H), the secondary side part 3 having a 350 mm height (h) and the connection part 4 having a 350 mm length (l), which connects the primary side part and the secondary side part, and a detachable divider 5 inserted into the lower end of the primary side part 2. As shown in FIG. 1, a sample (S) to be measured is filled in the primary side part on the divider 5 to the top of the primary side part. The durations from the time the divider is rapidly pulled out horizontally to the time the concrete composition comes into the condition as shown in FIG. 2, that is, the times the concrete composition reaches the point of A and the point of B, the length of a being 150 mm and the length of b being 50 mm, are measured, which expresses the fluidity of the samples.

Figure 2:
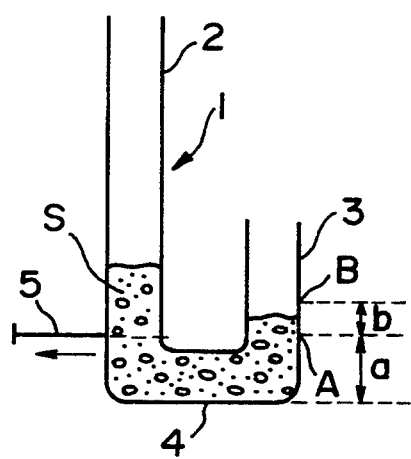
FIG. 2 is an L-type instrument for measuring fluidity, which shows the condition after a divider is pulled out.
Figure 3:
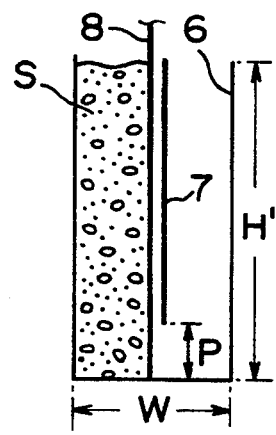
FIG. 3 is a box-type instrument for measuring filling property, which shows the condition after a sample is filled.
Figure 4:
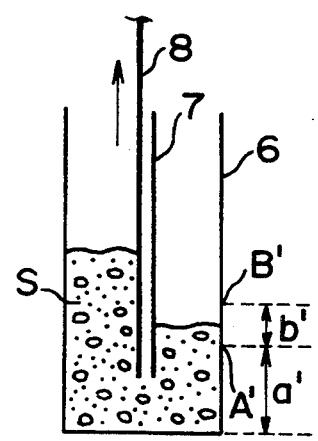
FIG. 4 is a box-type instrument for measuring filling property, which shows the condition after a sample is filled.

Filling Property Test:

The instrument for measuring filling property, as shown in FIG. 2, comprises a box type of main body 6 having a 500 mm height (H'), a 250 mm width (W) and a 250 mm depth (not shown in FIG. 2), a divider 7 fixed at a space p of 60 mm from the bottom of the box type of main body 6, and a slide 8 adjacent to the divider 7. As shown in FIG. 3, a sample (S) is filled in one side of the divider 7, that is, the side of the slide 8 in the condition where the slide 8 is adjacent to the bottom of the main body 6 along the center line of the main body 6, to the upper end of the main body 6. The durations from the time the slide 8 is rapidly pulled out vertically to the time the concrete composition is passed through the space p and comes into the condition shown in FIG. 4, that is, the times the concrete composition reaches the point of A' and the point of B', the length of a' being 150 mm and the length of b' being 50 mm, and the difference between the heights of the sample on both sides of the divider 3 minutes after the slide is pulled out, are measured. The filling properties of the samples are assessed by these measurements. In the above fluidity test, samples 3 and 4 of the present invention rapidly moved to the secondary side part after the divider 5 was pulled out, and the duration to the point of A was 13 seconds and that to the point of B was 33 seconds for sample 3, and the duration to the point of A was 9 seconds and that to the point of B was 27 seconds for sample 4. In the filling property test, the slide was pulled out after filling in the sample, and sample 3 came into the above conditions after 7 and 19 seconds, and sample 4 after 5 and 18 seconds. The difference described above was 25 mm for sample 3 and 30 mm for sample 4.

From these results, it can be understood that samples 3 and 4 of the present invention have high fluidity and filling property.

No aggregate separation was observed in the concrete structures made of these samples.

EXAMPLE 3

This example shows that a desired air content, which can attain sufficient, strength and resistance to freezing and thawing, can be introduced into a concrete composition, in the form of fine bubbles, and that sufficient fluidity, filling property and resistance to material segregation can be attained, by using both a cellulose type of viscosity improver and an acrylic type of viscosity improver according to the present invention, without any antifoaming agent.

On the basis of the materials shown in Table 11 and the proportions shown in Table 12, and using the viscosity improver, the air entraining water reducing agent, the superplasticizer and the air entraining agent in the amounts shown in Table 13, samples 5 and 6 of the present invention were prepared, and the air content, specific surface of the bubbles and coefficient of the bubble distance thereof were measured. The results are shown in Table 14.

TABLE 11

| Material Used | |
| --- | --- |
| Cement | Normal Portland Cement |
| Fine Aggregate | 60% of River Sand from the Sagami Water System, and 40% of Pit Sand from Ichihara (Specific Gravity 2.55, FM 2.50) |
| Coarse Aggregate | Crushed Stone from Shiroyama, Tsukui District, Kanagawa Prefecture, (Specific Gravity 2.64, FM 6.70) |
| Viscosity Improver | Hydroxyethyl cellulose Copolymer of Acrylamide and Sulfoalkylacrylamide which contains 10% mole of Sulfoalkylacrylamide monomer, based on Acrylamide monomer |
| Air Entraining Water Reducing Agent | Oxycarbonate |
| Superplasticizer | Highly Condensed Compound of Triazine Series |
| Air Entraining Agent | Sulfate Type of Nonionic Anionic Surfactant |

TABLE 12

| Proportions in Concrete | |
| --- | --- |
| Maximum Size of Coarse Aggregate (mm) | 20 |
| Slump (cm) | 12 ± 2.5 |
| Water-Cement Ratio (W/C) (%) | 50.0 |
| Sand-Coarse Aggregate Ratio (s/a) (%) | 50.7 |
| Water (kg/m$^3$) | 174 |
| Cement (kg/m$^3$) | 348 |
| Fine Aggregate (kg/m$^3$) | 875 |
| Coarse Aggregate (kg/m$^3$) | 880 |

TABLE 13

| Sample of Present Invention | Amount of | | | | |
| --- | --- | --- | --- | --- | --- |
| | Viscosity Improver (W$^x$ %) | | Air Entraining Water Reducing Agent (C$^x$ %) | Super-plasticizer (C$^x$ %) | Air Entraining Agent (C$^x$ %) |
| | Cellulse Type | Acrylic Type | | | |
| 5 | 0.225 | 0.075 | 0.20 | 2.65 | 0.006 |
| 6 | 0.250 | 0.050 | 0.20 | 2.65 | 0.005 |

TABLE 14

| Sample of Present Invention | Air Content (% by volume) | | | Specific Surface of Bubbles (cm$^2$/cm$^3$) | Coefficient of Bubble Distance (μm) | Resistance to Freezing and Thawing |
| --- | --- | --- | --- | --- | --- | --- |
| | Just After Preparation | After 30 min. | After Hardening | | | |
| 5 | 7.2 | 5.2 | 5.0 | 231 | 224 | good |
| 6 | 7.0 | 6.0 | 5.7 | 242 | 211 | good |

As shown in Table 14, it can be understood that, in samples 5 and 6, the air content necessary for resistance to freezing and thawing, 3 to 6% by volume, can be attained 30 minutes after preparation and after hardening, without increasing the air content just after preparation. Comparing Table 14 and Table 2, it is understood that samples 5 and 6 each have a larger specific surface of bubbles and smaller bubble distance, compared with the conventional high-fluid concrete composition, and thus, have numerous fine bubbles.

A freezing and thawing test for testing resistance to freezing and thawing was carried out for samples 5 and 6. This was the freezing and thawing test provided in JIS A6204 (Chemical Admixture for Concrete), appendix, "2. Freezing and Thawing Method for Concrete". The relative dynamic modulus of elasticity was 89 to 91% at 300 freezing and thawing cycles, and from this result, it was understood that these samples have sufficient resistance to freezing and thawing. The fluidity test and filling property test for samples 5 and 6 just after preparation by using the instruments shown in FIGS. 1 and 3 were carried out. From the results, it was understood that samples 5 and 6 have high fluidity and filling property. The concrete structure made of these samples contained no aggregate separation.

EXAMPLE 4

In this example, various types of hydroxyethyl cellulose were used as a cellulose type of viscosity improver to examine the effects thereof on a concrete composition and a concrete structure.

Samples 7 to 11 of the present invention and comparison samples 1 to 5 were prepared, on the basis of the materials shown in Table 15 and the proportions shown in Table 16, by using the hydroxyethyl cellulose of the type shown in Table 17 in the amount shown in Table 17 (only in comparison sample 5 was hydroxypropylmethyl cellulose used), water, the superplasticizer water reducing agent and the air entraining agent in the amounts shown in Table 17. Cement and the hydroxyethyl cellulose was added to aggregate and mixed for 1 minute, and water, the superplasticizer and the air entraining agent was added to the mixture and mixed for 3 minutes, by using a 50 liters pan type of mixer. Air content, slump flow value (or slump), filling property, resistance to freezing and thawing and compressive strength were measured for these samples, the results being shown in Table 18.

Comparison sample 1 is prepared by using aggregate, cement, water and an air entraining agent, comparison sample 2 by using a hydroxyethyl cellulose having low viscosity, comparison sample 3 by using a hydroxyethyl cellulose having a low molar substitution, comparison sample 4 by using a hydroxyethyl cellulose in a slight amount, and comparison sample 5 by using hydroxypropylmethyl cellulose as a viscosity improver having low surface tension.

TABLE 15

| | Material Used |
|---|---|
| Cement | Normal Portland Cement (abbreviated to OPC in Table 17, Specific Gravity 3.15, produced by Nippon Cement Co. Ltd.), sometimes with Joban Fly Ash (abbreviated to Fa in Table 17, Specific Gravity 2.20, produced by Joban Karyoku Sangyo Co. Ltd.) |
| Fine Aggregate | River Sand from the the Himekawa in Arai City (Absorption 2.47%, Specific Gravity 2.59, FM 2.86) |
| Coarse Aggregate | Crushed Stone from the Shimonigori in Arai City (Absorption 1.73%, Specific Gravity 2.63, FM 6.72) |
| Viscosity Improver | Hydroxyethyl Cellulose (abbreviated to HEC in Table 17) |
| Superplasticizer | Lheobuild NL-4000 (produced by NMB Co., Ltd.) |
| Air Entraining Agent | No. 303A (Alkylarylsurfonate series, produced by Pozoris Bussan Co. Ltd.) |

TABLE 16

| Proportions in Concrete | |
|---|---|
| Maximum Size of Coarse Aggregate (mm) | 20 |
| Sand-Coarse Aggregate Ratio (s/a) (%) | 50.0 |
| Cement (kg/m$^3$) | 348 |
| Fine Aggregate (kg/m$^3$) | 873 |
| Coarse Aggregate (kg/m$^3$) | 886 |

TABLE 17

| | HEC | | | | Cement Content per Unit Volume of Concrete kg/m$^3$ | | Water Content per Unit Volume of Concrete kg/m$^3$ | Amount of Superplasticizer l/m$^3$ | Amount of Air Entraining Agent g/m$^3$ |
|---|---|---|---|---|---|---|---|---|---|
| | Added Amount | Degree of Substitution | Viscosity cP | Surface Tension dyne/cm | OPC | Fa | | | |
| Sample of Present Invention | | | | | | | | | |
| 7 | 0.15 / 0.525 | 2.3 | 520 | 62 | 350 | 0 | 175 | 7.0 | 15 |
| 8 | 0.15 / 0.525 | 2.3 | 1050 | 62 | 350 | 0 | 175 | 10.5 | 15 |
| 9 | 0.15 / 0.525 | 2.0 | 1050 | 60 | 350 | 0 | 175 | 10.5 | 15 |
| 10 | 0.15 / 0.525 | 2.0 | 1050 | 62 | 350 | 70 | 170 | 10.5 | 20 |
| 11 | 0.10 / 0.35 | 2.3 | 1050 | 62 | 350 | 0 | 175 | 10.5 | 15 |
| Comparison Sample | | | | | | | | | |
| 1 | 0 | — | — | — | 350 | 0 | 185 | 0 | 15 |
| 2 | 0.15 / 0.525 | 2.3 | 50 | 62 | 350 | 0 | 175 | 10.5 | 20 |
| 3 | 0.15 / 0.525 | 1.3 | — | — | 350 | 0 | 175 | 10.5 | 15 |
| 4 | 0.01 / 0.035 | 2.3 | 1050 | 62 | 350 | 0 | 175 | 10.5 | 15 |
| 5 | 0.15 / 0.525 | — | 1050 | 52 | 350 | — | 175 | 10.5 | — |

The added amount of HEC corresponds to % by weight, based on cement, in the upper column and to weight per 1 m$^3$ of a concrete composition (kg/m$^3$), in the lower column.
Comparison sample 5 contains hydroxypropylmethyl cellulose as a viscosity improver.

TABLE 18

|  | Slump Flow Value cm | Slump cm | Air Content % by Volume | Filling Property (Percentage of Concrete Composition Passing through Reinforcing bars) % | Resistance to Freezing and Thawing (Relative Dynamic Modulus of Elasticity) % | Compressive Strength Age 28 days kgf/cm² |
| --- | --- | --- | --- | --- | --- | --- |
| Sample of Present Invention |  |  |  |  |  |  |
| 7 | 62.0 | — | 5.0 | 75.0 | 90.0 | 395 |
| 8 | 65.0 | — | 5.5 | 87.0 | 93.0 | 393 |
| 9 | 63.5 | — | 4.5 | 83.0 | 85.5 | 403 |
| 10 | 64.5 | — | 5.3 | 84.5 | 90.5 | 325 |
| 11 | 60.5 | — | 5.1 | 65.5 | 91.5 | 394 |
| Comparison Sample |  |  |  |  |  |  |
| 1 | — | 18 | 3.6 | 7.5 | 92.5 | 377 |
| 2 | 57.0 | — | 4.9 | 15.0 | — | — |
| 3 | — | — | — | — | — | — |
| 4 | — | — | — | — | — | — |
| 5 | 62.5 | — | 17.5 | 75.0 | — | — |

Hard aggregate separation in comparison samples 3 and 4 and thus a test piece can not be made.

The results of the filling property in Table 18 were obtained by the following test.

Filling Property Test:

30 liters of a concrete composition is filled in an apparatus comprising a concrete can type container with a size of 318 mm × 318 mm × 400 mm and a net of D-16 reinforcing bars, the opening of which is 50 mm, fitted on the bottom of the can, and the amount discharged in 5 minutes is measured. Filling property is evaluated from the percentage of concrete composition passing through the reinforcing bars determined by the formula: Percentage of concrete composition passing through the reinforcing bars (%)=(Amount passing through Reinforcing Bars/Filled Amount)×100.

From Table 18, it can be seen that samples 7 to 11 of the present invention have high fluidity, and are excellent in the filling property and resistance to freezing and thawing, in comparison with comparison sample 1.

Comparison sample 2, where the viscosity of hydroxyethyl cellulose is low, has poor filling property.

Comparison sample 3, where the hydroxyethyl cellulose having a low molar substitution is used, is slightly soluble, and is not suitable for the present invention.

Comparison sample 4, where the added amount of hydroxyethyl cellulose is markedly low, has poor filling property.

Comparison sample 5, where the hydroxypropylmethyl cellulose is used as a water-soluble polymer having a low surface tension, contains large bubbles and thus has excessive air content, so the sample has low strength.

Sample 10 of the present invention, where cement and fly ash are both used, has less water, and is excellent in strength, durability, etc.

EXAMPLE 5

In this example, the effect of Vinsol ®, which is an air entraining agent of resin acid soap series, on a concrete composition and a concrete structure was examined.

Samples 12 to 16 of the present invention and comparison sample 6 were prepared, on the basis of the materials shown in Table 19 and the proportions shown in Table 20, by using the hydroxyethyl cellulose of the type and the amount thereof shown in Table 21, water, the superplasticizer and the air entraining agent in the amounts shown in Table 21. Cement and the hydroxyethyl cellulose was added to aggregate and the mixture was mixed for 1 minute, and water, the superplasticizer and the air entraining agent was added to the mixture and mixed 3 minutes, by using a 50 liters pan type of mixer. The slump flow value (or slump), air content, filling property, resistance to freezing and thawing and compressive strength were measured for these samples and the results are shown in Table 22.

TABLE 19

| Material Used | |
| --- | --- |
| Cement | Normal Portland Cement (abbreviated to OPC in Table 21, Specific Gravity 3.15, produced by Nippon Cement Co. Ltd.), sometimes with Joban Fly Ash (abbreviated to Fa in Table 21, Specific Gravity 2.20, produced by Joban Karyoku Sangyo Co. Ltd.) |
| Fine Aggregate | River Sand from the Himekawa in Arai City (Absorption 2.47%, Specific Gravity 2.59, FM 2.86) |
| Coarse Aggregate | Crushed Stone from the Shimonigori in Arai City (Absorption 1.73%, Specific Gravity 2.63, FM 6.72) |
| Viscosity Improver | Hydroxyethyl cellulose (abbreviated to HEC in Table 21) |
| Superplasticizer | Bussan Co. Ltd.) |
| Air Entraining Agent | Vinsol ® (resin acid soap series, produced by YAMASO CHEMICAL Co., Ltd.) |

*⁷⁾FM means fineness modulus.

TABLE 20

| Proportions in Concrete | |
| --- | --- |
| Maximum Size of Coarse Aggregate (mm) | 20 |
| Sand-Coarse Aggregate Ratio (s/a) (%) | 50.0 |
| Cement (kg/m³) | 348 |
| Fine Aggregate (kg/m³) | 873 |
| Coarse Aggregate (kg/m³) | 886 |

TABLE 21

| | HEC | | | | Cement Content per Unit Volume of Concrete kg/m³ | | Water Content per Unit Volume of Concrete kg/m³ | Amount of Superplasticizer l/m³ | Amount of Air Entraining Agent g/m³ |
| --- | --- | --- | --- | --- | --- | --- | --- | --- | --- |
| | Added Amount | Degree of Substitution | Viscosity cP | Surface Tension dyne/cm | OPC | Fa | | | |
| Sample of Present Invention | | | | | | | | | |
| 12 | 0.15 / 0.525 | 2.3 | 520 | 62 | 350 | 0 | 175 | 7.0 | 20 |
| 13 | 0.15 / 0.525 | 2.3 | 1050 | 62 | 350 | 0 | 175 | 10.5 | 20 |
| 14 | 0.15 / 0.525 | 2.3 | 1050 | 62 | 350 | 0 | 175 | 10.5 | 15 |
| 15 | 0.15 / 0.525 | 2.3 | 1050 | 62 | 280 | 70 | 170 | 10.5 | 25 |
| 16 | 0.10 / 0.35 | 2.3 | 1050 | 62 | 350 | 0 | 175 | 10.5 | 25 |
| Comparison Sample | | | | | | | | | |
| 6 | 0.15 / 0.525 | 2.3 | 1050 | 62 | 350 | 0 | 175 | 10.5 | 5 |

The added amount of HEC corresponds to % by weight, based on cement, in the upper column and to weight per 1 m³ of a concrete composition (kg/m³), in the lower column.

TABLE 22

| | Slump Flow Value cm | Air Content % by Volume | Filling Property (Percentage of Concrete Composition Passing through Reinforcing bars) % | Resistance to Freezing and Thawing (Relative Dynamic Modulus of Elasticity) % | Compressive Strength Age 28 days kgf/cm² |
| --- | --- | --- | --- | --- | --- |
| Sample of Present Invention | | | | | |
| 12 | 62.0 | 5.5 | 73.0 | 91.0 | 397 |
| 13 | 65.3 | 6.1 | 86.0 | 92.0 | 395 |
| 14 | 62.5 | 5.1 | 84.0 | 87.5 | 400 |
| 15 | 64.0 | 5.5 | 83.0 | 89.5 | 320 |
| 16 | 59.5 | 5.3 | 62.5 | 88.5 | 390 |
| Comparison Sample | | | | | |
| 6 | 60.0 | 3.5 | 80.0 | $\leq 20$ | 402 |

The results of the filling property in Table 21 were obtained by the same method as the one used in example 4.

It is further understood by those skilled in the art that the foregoing description is a preferred embodiment of the disclosed composition and that various changes and modifications may be made in the invention without departing from the spirit and scope thereof.

What is claimed is:

1. A concrete composition comprising cement, water, fine aggregate, coarse aggregate, a superplasticizer, (a) at least one admixture selected from a water reducing agent, an air entraining agent, and an air entraining water reducing agent and (b) at least one viscosity improver, selected from the group consisting of a cellulose viscosity improver having a low foaming property which shows 100 to 10,000 centipoises of viscosity at a 1% ratio in an aqueous solution and an acrylic viscosity improver having a low viscosity which shows 5 to 100 centipoises viscosity at a 0.5% ratio in a 4% saltwater solution and is exclusive of an antifoaming agent, wherein a total amount of the viscosity improver is 0.02% to 0.5% by weight based on cement and having a superior fluidity and resistance to material segregation.

2. A concrete composition as claimed in claim 1, wherein the concrete composition has 45 to 80 cm of slump flow value.

3. A concrete composition as claimed in claim 2, wherein the cellulose viscosity improver shows 500 to 6,000 centipoises at a 1% ratio in an aqueous solution.

4. A concrete composition as claimed in claim 2, wherein the acrylic viscosity improver shows 20 to 50 centipoises at a 0.5% ratio in a 4% saltwater solution.

5. A concrete composition as claimed in claim 2, wherein the acrylic viscosity improver is a copolymer of acrylamide or methacryamide and sulfoalkylacrylamide which contains 2 mole% or more sulfoalkylacrylamide monomer, based on acrylamide or methacrylamide monomer.

6. A concrete composition as claimed in claim 2, wherein the cellulose viscosity improver is hydroxyethyl cellulose.

7. A concrete composition as claimed in claim 6, wherein the hydroxyethyl cellulose shows 58 to 68 dynes/cm of surface tension at a ratio 0.2% in an aqueous solution.

8. A concrete composition as claimed in claim 6, wherein the hydroxyethyl cellulose has 1.5 to 4.0 of molar substitution of hydroxyethyl.

9. A concrete composition as claimed in claim 7, wherein the hydroxyethyl cellulose has 1.5 to 4.0 of molar substitution of hydroxyethyl.

10. A concrete composition as claimed in claim 9, further comprising at least one additional component selected from the group consisting of blast furnace slag powder, an expanding agent, fly ash, and silica powder.

11. A concrete composition as claimed in claim 9, wherein the air entraining agent is fatty acid soap or resin acid soap.

12. A concrete composition as claimed in claim 11, wherein at least one selected from the group consisting of blast furnace slag powder, an expanding agent, fly ash, and silica powder is further contained.

13. A concrete composition as claimed in claim 2, wherein the air entraining agent is fatty acid or resin acid.

14. A concrete composition comprising cement, water, fine aggregate, coarse aggregate, a superplasticizer, (a) at least one admixture selected from a water reducing agent, an air entraining agent, and an air entraining water reducing agent and (b) at least one viscosity improver selected from the group consisting of a cellulose viscosity improver having a low foaming property which shows 100 to 10,000 centipoises of viscosity at a 1% ratio in an aqueous solution and an acrylic viscosity improver having a low viscosity which shows 5 to 100 centipoises of viscosity at a 0.5% ratio in a 4% saltwater solution and is exclusive of an antifoaming agent, wherein a total amount of the viscosity improver is 0.1 to 1.0% by weight, based on water and having superior fluidity and resistance to material segregation.

15. A concrete composition as claimed in claim 14, wherein the concrete composition has 45 to 80 cm of slump flow value.

16. A concrete composition as claimed in claim 15, wherein the cellulose viscosity improver shows 500 to 6,000 centipoises at a 1% ratio in an aqueous solution.

17. A concrete composition as claimed in claim 15, wherein the acrylic viscosity improver shows 20 to 50 centipoises at a 0.5% ratio in a 4% saltwater solution.

18. A concrete composition as claimed in claim 15, wherein the acrylic viscosity improver is a copolymer of acrylamide or methacryamide and sulfoalkylacrylamide which contains 2 mole % or more sulfoalkylacrylamide monomer, based on acrylamide or methacrylamide monomer.

19. A concrete composition as claimed in claim 15, wherein the cellulose viscosity improver is hydroxyethyl cellulose.

20. A concrete composition as claimed in claim 19, wherein the hydroxyethyl cellulose shows 58 to 68 dynes/cm of surface tension at a ratio 0.2% in an aqueous solution.

21. A concrete composition as claimed in claim 19, wherein the hydroxyethyl cellulose has 1.5 to 4.0 of molar substitution of hydroxyethyl.

22. A concrete composition as claimed in claim 20, wherein the hydroxyethyl cellulose has 1.5 to 4.0 of molar substitution of hydroxyethyl.

23. A concrete composition as claimed in claim 22, further comprising at least one additional component selected from the group consisting of blast furnace slag powder, an expanding agent, fly ash, and silica powder.

24. A concrete composition as claimed in claim 22, wherein the air entraining agent is fatty acid or resin acid.

25. A concrete composition as claimed in claim 24, further comprising at least one additional component selected from the group consisting of blast furnace slag powder, an expanding agent, fly ash, and silica powder.

26. A concrete composition as claimed in claim 15, wherein the air entraining agent is fatty acid or resin acid.

27. A concrete composition comprising 250 to 450 kg. of cement, 1600 to 1900 kg/m$^3$ of aggregate, 160 to 195 kg of water, 0.05 to 2.1 kg of at least one viscosity improver selected from the group consisting of a cellulose viscosity improver having a low foaming property which shows 100 to 10,000 centipoises of viscosity at a 1% ratio in an aqueous solution and an acrylic viscosity improver having a low viscosity which shows 5 to 100 centipoises viscosity at a 0.5% ratio in a 4% saltwater solution and is exclusive of an antifoaming agent, 5 to 20 liters of at least one superplasticizer and 5 to 800 g of an air entraining agent are contained per m$^3$ of the concrete composition.

28. A concrete composition as claimed in claim 27, wherein the concrete composition has 45 to 80 cm of slump flow value.

29. A concrete composition as claimed in claim 28, wherein the cellulose viscosity improver shows 500 to 6,000 centipoises at a 1% ratio in an aqueous solution.

30. A concrete composition as claimed in claim 28, wherein the acrylic viscosity improver shows 20 to 50 centipoises at a 0.5% ratio in a 4% saltwater solution.

31. A concrete composition as claimed in claim 28, wherein the acrylic viscosity improver is a copolymer of acrylamide or methacryamide and sulfoalkylacrylamide which contains 2 mole % or more sulfoalkylacrylamide monomer, based on acrylamide or methacrylamide monomer.

32. A concrete composition as claimed in claim 28, wherein the cellulose viscosity improver is hydroxyethyl cellulose.

33. A concrete composition as claimed in claim 32, wherein the hydroxyethyl cellulose shows 58 to 68 dynes/cm of surface tension at a ratio 0.2% in an aqueous solution.

34. A concrete composition as claimed in claim 32, wherein the hydroxyethyl cellulose has 1.5 to 4.0 of molar substitution of hydroxyethyl.

35. A concrete composition as claimed in claim 33, wherein the hydroxyethyl cellulose has 1.5 to 4.0 of molar substitution of hydroxyethyl.

36. A concrete composition as claimed in claim 35, further comprising at least one additional component selected from the group consisting of blast furnace slag powder, an expanding agent, fly ash, and silica powder.

37. A concrete composition as claimed in claim 35, wherein the air entraining agent is fatty acid soap or resin acid soap.

38. A concrete composition as claimed in claim 37, further comprising at least one additional component selected from the group consisting of blast furnace slag powder, an expanding agent, fly ash, and silica powder.

39. A concrete composition as claimed in claim 28, wherein the air entraining agent is fatty acid soap or resin acid soap.

* * * * *